US011661859B2

(12) United States Patent
Adibhatla et al.

(10) Patent No.: US 11,661,859 B2
(45) Date of Patent: May 30, 2023

(54) METHOD FOR OPERATING A TURBO MACHINE

(71) Applicant: General Electric Company, Schenectady, NY (US)

(72) Inventors: Sridhar Adibhatla, Glendale, OH (US); John Thomas Herbon, Loveland, OH (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 17/085,129

(22) Filed: Oct. 30, 2020

(65) Prior Publication Data

US 2021/0062675 A1 Mar. 4, 2021

Related U.S. Application Data

(63) Continuation of application No. 16/001,369, filed on Jun. 6, 2018, now Pat. No. 10,822,993.

(51) Int. Cl.

| | |
|---|---|
| ***F02C 9/00*** | (2006.01) |
| ***F01D 17/08*** | (2006.01) |
| ***F01D 17/04*** | (2006.01) |
| ***F01D 17/06*** | (2006.01) |

(52) U.S. Cl.

CPC ........... *F01D 17/085* (2013.01); *F01D 17/04* (2013.01); *F01D 17/06* (2013.01); *F05D 2260/80* (2013.01); *F05D 2270/50* (2013.01); *F05D 2270/80* (2013.01)

(58) Field of Classification Search

CPC ........ F01D 17/04; F01D 17/06; F01D 17/085; F02B 39/16; F02C 9/28; F02C 3/04; F05D 2270/30; F05D 2270/50; F05D 2260/80; F05D 2260/821

USPC ............ 701/100; 60/772; 73/114.68, 114.74; 702/114, 183, 127

See application file for complete search history.

(56) References Cited

U.S. PATENT DOCUMENTS

| | | | |
|---|---|---|---|
| 3,348,414 | A | 10/1967 | Waters et al. |
| 4,575,803 | A | 3/1986 | Moore |
| 5,012,420 | A | 4/1991 | Walker et al. |
| 5,720,266 | A | 2/1998 | Nogi et al. |
| 6,498,978 | B2 | 12/2002 | Leamy et al. |
| 6,539,783 | B1 | 4/2003 | Adibhatla |
| 6,768,938 | B2 | 7/2004 | McBrien et al. |
| 6,983,603 | B2 | 1/2006 | Macchia |
| 7,246,002 | B2 | 7/2007 | Healy et al. |
| 7,739,873 | B2 | 6/2010 | Venkataramani et al. |

(Continued)

*Primary Examiner* — Dalena Tran

(74) *Attorney, Agent, or Firm* — Dority & Manning, P.A.

(57) ABSTRACT

A system and method for determining performance of an engine is provided. The system includes two or more sensors configured in operable arrangement at two or more respective positions at a flowpath. The system includes one or more computing devices configured to perform operations, the operations include acquiring, via the two or more sensors, parameter sets each corresponding to two or more engine conditions different from one another, wherein each parameter set indicates a health condition at a respective location at the engine; comparing, via the computing device, the parameter sets to determine the respective health condition corresponding to the respective location at the engine; and generating, via the computing device, a health condition prediction based on the compared parameter sets.

17 Claims, 4 Drawing Sheets

(56) References Cited

U.S. PATENT DOCUMENTS

| | | | | |
|---|---|---|---|---|
| 7,784,263 | B2 | 8/2010 | Ponziani | |
| 8,050,843 | B2 * | 11/2011 | von Hoff | G05B 23/0254 701/99 |
| 8,355,854 | B2 | 1/2013 | Childers | |
| 8,437,941 | B2 | 5/2013 | Chandler | |
| 8,471,702 | B2 | 6/2013 | Babu et al. | |
| 9,014,918 | B2 | 4/2015 | Hagen et al. | |
| 9,057,596 | B2 | 6/2015 | Xu et al. | |
| 9,267,439 | B2 | 2/2016 | Corson et al. | |
| 9,297,707 | B2 | 3/2016 | Bellis et al. | |
| 9,797,328 | B2 | 10/2017 | Martinez et al. | |
| 10,254,752 | B2 | 4/2019 | Panov | |
| 2004/0148139 | A1 * | 7/2004 | Nguyen | G06K 9/00536 702/189 |
| 2007/0214796 | A1 * | 9/2007 | Bland | F01D 21/003 60/804 |
| 2008/0154473 | A1 * | 6/2008 | Volponi | G05B 23/0262 701/100 |
| 2010/0257838 | A1 | 10/2010 | Mazzaro et al. | |
| 2012/0191427 | A1 * | 7/2012 | Cianflone | F02D 41/0007 703/2 |
| 2012/0330495 | A1 | 12/2012 | Geib et al. | |
| 2013/0111982 | A1 | 5/2013 | Batzinger et al. | |
| 2013/0131951 | A1 | 5/2013 | Pandey et al. | |
| 2014/0271114 | A1 | 9/2014 | Phillips et al. | |
| 2014/0278200 | A1 | 9/2014 | DeSilva | |
| 2016/0273379 | A1 | 9/2016 | Soares, Jr. et al. | |
| 2017/0114660 | A1 | 4/2017 | James | |
| 2017/0175646 | A1 | 6/2017 | Adibhatla | |
| 2017/0260871 | A1 | 9/2017 | Schmidt et al. | |
| 2018/0334965 | A1 | 11/2018 | Ortiz et al. | |

* cited by examiner

METHOD FOR OPERATING A TURBO MACHINE

CROSS-REFERENCE TO RELATED APPLICATIONS

The present application claims the benefit of the earliest available effective filing date of U.S. patent application Ser. No. 16/001,369, having a filing date of Jun. 6, 2018 and issued as U.S. Pat. No. 10,822,993, of which is incorporated herein by reference in its entirety.

FIELD

The present subject matter relates generally to methods for operating a turbo machine based on diagnosing, maintaining, or improving turbo machine engine health, operability, or performance.

BACKGROUND

Turbo machines, such as gas or steam turbine engines, use information from a specific operating condition to determine engine health, operability, or performance of the turbo machine. However, known methods and systems for determining engine health, operability, or performance are limited such as to provide similar information across multiple engine conditions. Determining engine health, operability, or performance may exclude information that may indicate health, operability, or performance across multiple locations of the engine. As such, there is a need for improved methods and systems for determining engine health, operability, or performance.

BRIEF DESCRIPTION

Aspects and advantages of the invention will be set forth in part in the following description, or may be obvious from the description, or may be learned through practice of the invention.

An aspect of the present disclosure is directed to a system for determining performance of a turbine engine. The system includes a plurality of sensors and one or more computing devices executing operations including acquiring, via the plurality of sensors, a plurality of parameter sets each corresponding to a plurality of engine conditions in which each parameter set corresponding to each engine condition indicates a health condition at a plurality of locations at the engine; comparing, via the computing device, the plurality of parameter sets to determine a health condition corresponding to a location at the engine; and generating, via the computing device, a health condition prediction at the engine based on the compared parameters.

In various embodiments, the operations further include acquiring, via a first sensor, a first parameter set based on a first engine operating condition indicating a health condition at a first location of the engine; and acquiring, via the first sensor, a second parameter set based on a second engine operating condition indicating a health condition at a second location different from the first location.

In one embodiment, the operations further include acquiring, via a second sensor, a third parameter set based on the first engine operating condition indicating a health condition at the second location; and acquiring, via the second sensor, a fourth parameter set based on the second engine operating condition indicating a health condition at the first location.

In another embodiment, the operations further include comparing, via the computing device, the first parameter set, the second parameter set, the third parameter set, and the fourth parameter set to determine a health condition corresponding to a location at the engine.

In still another embodiment, the operations further include comparing the parameter sets to determine the health condition at the first location; and comparing the parameter sets to determine the health condition at the second location.

In yet another embodiment, the operations further include comparing the first parameter set and the fourth parameter set to determine the health condition at the first location.

In still yet another embodiment, the operations further include comparing the second parameter set and the third parameter set to determine the health condition at the second location.

In one embodiment, the operations further include determining, via the computing device, one or more locations of a health deterioration contributor via the compared parameter sets.

In various embodiments, the operations further include generating, via the computing device, a signal to an operator of the engine indicating an action item for the user/operator to perform. In one embodiment, the operations further include transmitting, via the computing device, the signal indicating an engine manoeuver. In another embodiment, the operations further include transmitting, via the computing device, the signal indicating a maintenance action. In still another embodiment, the operations further include transmitting, via the computing device, the signal indicating an operating limit.

In one embodiment, the operations further include operating the engine at a plurality of engine operating condition to generate a quantity of engine operating conditions at a plurality of different operating conditions.

Another aspect of the present disclosure is directed to a method for operating an engine based on a health deterioration condition. The method includes acquiring a plurality of parameter sets each corresponding to a plurality of engine conditions, in which each parameter set corresponding to each engine condition indicates a health condition at a plurality of locations at the engine; comparing the plurality of parameter sets to determine a health condition corresponding to a location at the engine; and generating a health condition prediction at the engine based on the compared parameters.

In one embodiment, the method further includes determining one or more locations of a health deterioration contributor via the compared parameter sets.

In various embodiments, the method further includes generating a signal to an operator of the engine indicating an action item for the user/operator to perform. In one embodiment, the method further includes transmitting the signal indicating an engine manoeuver. In another embodiment, the method further includes transmitting the signal indicating a maintenance action. In yet another embodiment, the method further includes transmitting the signal indicating an operating limit. In still another embodiment, the method further includes operating the engine at a plurality of engine operating condition to generate a quantity of engine operating conditions at a plurality of different operating conditions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
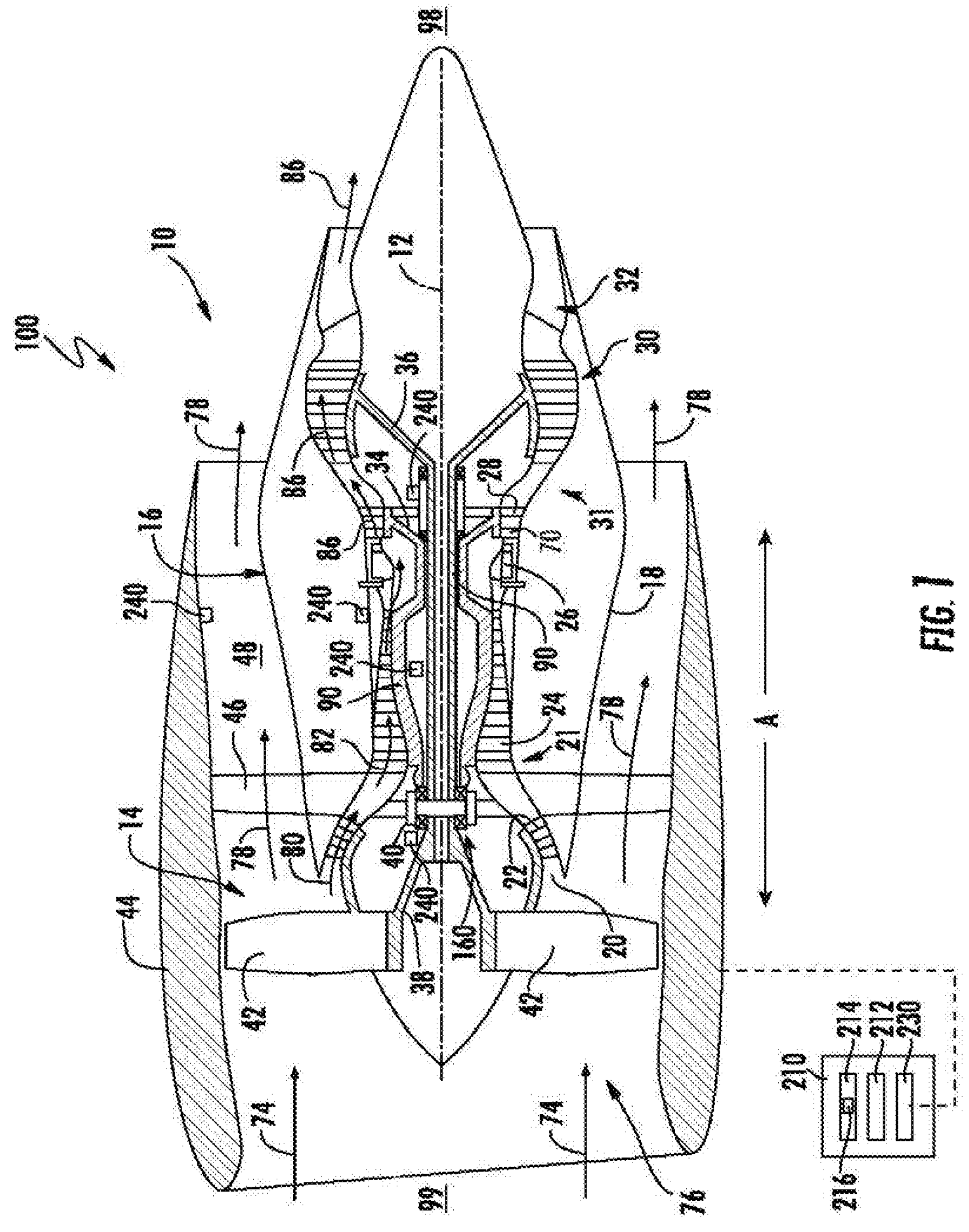
FIG. 1 is an exemplary schematic cross sectional view of an embodiment of a turbo machine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. In regard to the figures, such as depicted in regard to FIG. 1, "upstream end 99" depicts a reference from which fluid flows into an engine 10 and "downstream end 98" depicts a reference to which the fluid flows from the upstream end 99.

Generally provided are methods (e.g., method 1000 further described below) and systems (e.g., system 100 further described below) for determining a health condition of a turbo machine (hereinafter, "engine") at one or more locations at the engine, and operation based on the determined health condition. The system 100 includes a plurality of sensors acquiring data or parameter sets at each engine operating condition. Each acquired parameter set corresponds to or reflects an upstream health condition of the system. The system 100 and method 1000 compares each acquired parameter set from each sensor at two or more engine operating conditions and then combines the parameter sets to determine a location at the engine at which a health deterioration contributor is located.

In one embodiment, the sensors may define temperature probes (e.g., exhaust gas temperature or EGT probes) measuring a circumferential temperature profile or pattern factor around a flowpath of the engine. Each engine operating condition defines one or more of a different fluid (e.g., air, fuel, fuel-air mixture, or combustion gas) flow rate, pressure, temperature, vorticity, circumferential swirl, boundary condition, or another physical or chemical property of the fluid, or combinations thereof. Each change in engine operating condition may be based on one or more of a flight condition such as start, idle, takeoff, climb, cruise, or descent (or equivalent operating condition in other turbo machine configurations), a change in vane schedule (e.g., vane angle), bleed schedule (e.g., amount open or close of a bleed valve), rotor speed, ambient air condition (e.g., temperature, pressure, density, etc., of air entering the engine), fuel-air ratio, or health deterioration contributor (e.g., degradation, wear, or damage, rotor to shroud clearances, malfunctions, etc.), or combinations thereof. Still further, in one example, the health condition defining a fault location may reflect wear, damage, or degradation at a location in the engine (e.g., the location being one or more fuel nozzles upstream of the sensor defining the EGT probe). As such, each change in engine operating condition results in the sensor acquiring a parameter set (e.g., temperature profile at the flowpath) reflecting a different location (e.g., fuel nozzle) with each change in engine operating condition. More specifically, higher power engine operating conditions may result in a different circumferential swirl of fluid in contrast to lower power engine operating conditions such that the sensor acquires the parameter set reflecting a different fuel nozzle or plurality of fuel nozzles based on each change in engine operating condition.

As each parameter set from the sensor reflects a different fuel nozzle(s) at each engine operating condition, the system and method compares and combines the parameter sets from each of the engine operating conditions to determine the location of the health deterioration contributor (e.g., damaged, deteriorated, or otherwise malfunctioning fuel nozzle).

For example, a plurality of sensors S acquires a plurality of parameter sets P based on each engine operating condition E in which each sensor determines a health condition at location L upstream of the sensors S. More specifically, in one embodiment, a first sensor S1 acquiring a first parameter set P1E1S1 based on a first engine operating condition E1 may indicate a health condition of a first fuel nozzle at location L1. However, the first sensor S1 acquiring a second parameter set P1'E2S1 based on a second engine operating condition E2 (i.e., different from the first engine operating condition E1) may indicate a health condition of a second fuel nozzle at location L1' (i.e., more generally, not the first fuel nozzle at location L1). Still further, the second parameter set P1'E2S1 may further indicate the health condition of the second fuel nozzle at location L1' relative to the second engine operating condition E2 but not relative to the first engine operating condition E1. As such, a user or operator of the engine is aware of the health condition at L1 relative to E1 and the health condition at L1' relative to E2. However, the user is not aware of the health condition at L1 relative to E2 and the health condition at L1' relative to E1.

As such, the system 100 and method 1000 further acquires, via a second sensor S2, a third parameter set P1'E1S2 based on the first engine operating condition E1 indicating a health condition of the second fuel nozzle at location L1'. Still further, the second sensor S2 acquires a fourth parameter set P1E2S2 based on the second engine operating condition E2 indicating a health condition of the first fuel nozzle at location L1.

The method 1000 and system 100 compares the parameter sets and determines the health condition at L1 based on P1E1S1 and P1E2S2. The method and system further compares the parameter sets and determines the health condition at the fuel nozzle at location L1' based on P1'E2S1 and P1'E1S2. As such, the method and system determines the health condition of the engine at the fuel nozzle at location L1 relative to engine operating conditions E1 and E2, and further the health condition at location L1' relative to engine operating conditions E1 and E2.

As such, the method 1000 and system 100 generally described herein enables more precise determination of the health condition within the engine. For example, the method and system described herein may determine, via the plurality of sensors defining EGT probes, a faulty fuel nozzle upstream of the sensors at one or more engine operating conditions. For example, the fuel nozzle may define faulty operation at a low power condition (e.g., startup, ground idle, etc.) but not at a higher power condition (e.g., cruise, climb, takeoff, etc.). The method and system described herein may determine specifically the location of the faulty fuel nozzle and/or which engine operating conditions at which the fuel nozzle defines faulty behavior.

Although described in regard to fuel nozzles, it should be appreciated that the method 1000 and system 100 described herein may be utilized to determine a location(s) at the engine at which a health deterioration contributor is present. For example, such as previously described, the methods and systems described herein may determine which one or more of a plurality of fuel nozzles defines a faulty condition (e.g., damage, wear, deterioration, blockage, etc.), and/or at which engine operating conditions the fault in present (e.g., start, ground idle, flight idle, cruise, approach, climb, takeoff, etc., or corresponding conditions in other turbo machine configurations). As another example, the method and system may define which one or more of a fixed or variable vane is faulty (e.g., mis-positioned, damaged, worn, etc.), or a bleed valve faulty operation. As yet another example, the method and system may define generally a circumferential, radial, and/or axial location within the engine at which a fault in the flowpath is present (e.g., blockage, foreign or domestic object damage, coating or material loss, etc.).

Furthermore, it should be appreciated that the method 1000 and system 100 described herein may be utilized to compare and combine a plurality of parameter sets acquired via a plurality of sensors over a plurality of engine operating conditions to determine a health condition at a plurality of locations at the engine. As such, system may generally include a quantity N of sensors S in which N>1. The system and method may further include operating the engine at a quantity X of engine operating conditions in which X>1. The system and method further determines the health condition at each of a quantity of locations less than or equal to N.

Additionally, or alternatively, the system 100 and method 1000 described herein may include determining the location L of the health condition over a circumferential, radial, and/or axial range at the engine. As such, in one embodiment locations L and L' may partially overlap. In another embodiment, locations L and L' are non-overlapping.

Although generally described herein as methods 1000 and systems 100 for determining a health condition of the engine, it should be appreciated that "health condition", "health condition prediction", "health deterioration contributor", etc. may further refer to performance and/or operability conditions, predictions, or deterioration contributors. For example, the health condition may further indicate one or more locations at the engine affecting engine operability or performance, including, but not limited to, rotating stall or surge, deteriorated emissions performance (e.g., increased unburned hydrocarbons, smoke, carbon monoxide, carbon dioxide, oxides of nitrogen, etc.), decreased lean or rich blowout stability, increased engine or combustion dynamics, etc.

Each sensor S of the plurality of the sensors is perceptible over a measurement range R within the engine, such as to measure the parameter set P. The measurement range R is a function of at least a predetermined distance U and a coefficient C based on an engine operating condition E. The predetermined distance U may generally define a circumferential, radial, or axial distance, or combinations thereof (e.g., three-dimensions) within the flowpath through which the fluid flows and at which the sensor S may perceive, detect, or otherwise measure the parameter set P at a baseline or nominal condition. For example, the predetermined distance U may generally define a maximum distance or range along the circumferential, radial, or axial distance, or combinations thereof, within the flowpath at which parameter set P may be measured given an ideal condition. In one example, such an ideal condition may generally define an ambient condition. In another example, the ideal condition may generally define a baseline steady state condition of the engine during operation. Such a baseline steady state condition may include a minimum or a maximum steady state operating condition of the engine.

Changes in engine operating condition E, such as particularly changes in flow condition, alter or otherwise change the measurement range R of the plurality of sensors S based on changes in engine operating condition E. In various embodiments, changes in engine operating condition E define the coefficient C based on each engine operating condition E multiplied to the predetermined distance U such as to alter the measurement range R based on engine operating condition E. For example, in one embodiment, the coefficient C is greater than zero and less than or equal to 1.0. Therefore, the measurement range R may alter based on a function of $R=F(C_X, E_X)$.

Each sensor S defines the measurement range R as a function of at least the engine operating condition E and the predetermined distance U. Each sensor S thereby measures, calculates, or otherwise acquires parameter set P across range R relative to each engine operating condition E. Stated alternatively, each parameter set P reflects a different range R relative to each engine operating condition E. As such, the system and method described herein enables combining the plurality of parameter sets P corresponding to different engine operating conditions E to determine the health condition at each location L at the engine.

For example, referring to FIGS. 3A-3B, exemplary cross sectional views of an exemplary turbo machine (hereinafter, "engine 10") are generally provided. In regard to FIG. 3A, the sensor S1 defines a measurement range RE1S1 based on a first engine operating condition E1, a predetermined distance U, and a first coefficient C1 based on the engine operating condition E1. In regard to FIG. 3B, the sensor S1 defines a measurement range RE2S1 based on a second engine operating condition E2, the predetermined distance U, and a second coefficient C2 (i.e., different from the first coefficient C1) based on the engine operating condition E2.

Figure 3A:
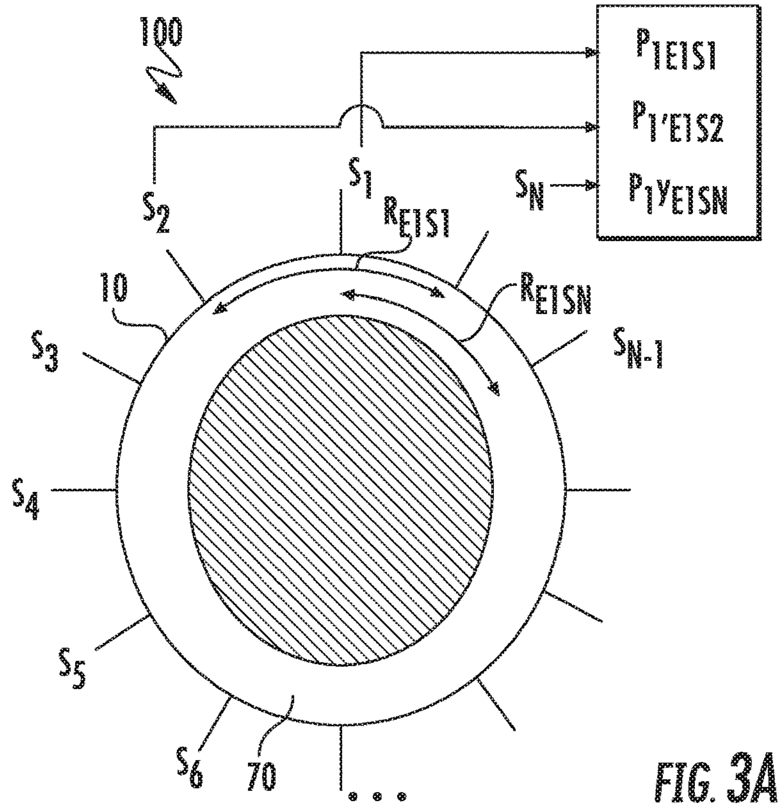
FIGS. 3A-3B are exemplary cross sectional views of a flowpath of the turbo machine according to FIG. 1 depicting a plurality of engine operating conditions.

Referring to FIG. 3A, each sensor S through N quantity of sensors (e.g., S1, S2, S3 . . . , S(N−1), SN) defines the measurement range R based on the first engine operating condition E1, the predetermined distance U, and the first coefficient C1 based on the first operating condition E1. For example, sensor S1 defines measurement range RE1S1; sensor S2 defines measurement range RE1S2 (not shown); up to sensor SN defining measurement range RE1SN.

Figure 3B:
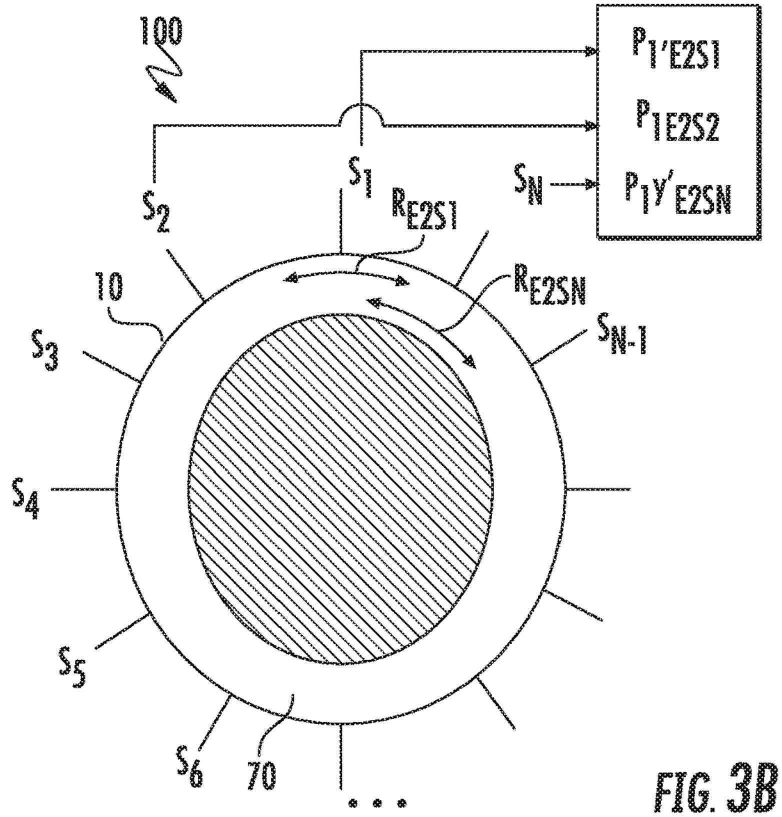

Referring to FIG. 3B, each sensor S from S1 through SN defines the measurement range R based on the second engine operating condition E2, the predetermined distance U, and the second coefficient C2 based on the second operating condition E2. For example, sensor S1 defines measurement range RE2S1; sensor S2 defines measurement range RE2S2 (not shown); up to sensor SN defining measurement range RE2SN.

It should be appreciated that each sensor S defines the measurement range R at each engine operating condition E such that the measurement range R at X quantity of engine operating conditions at sensor S1 is REXS1; at sensor S2 the measurement range REXS2; up to sensor SN defining measurement range REXSN.

Referring now to the drawings, FIG. 1 is a schematic partially cross-sectioned side view of the engine 10 as may incorporate various embodiments of the present invention. The engine 10, or portions thereof, may be included in the system 100 for determining health deterioration at the turbo machine, and a location of the health deterioration. Although generally depicted herein as a turbofan configuration, the engine 10 shown and described herein may further define a steam turbine engine or gas turbine engine generally, including, but not limited to, turboprop, turboshaft, or turbojet configurations, or in other embodiments, a duct burner, ramjet, scramjet, etc. configuration of Brayton cycle machine. As shown in FIG. 1, the engine 10 has a longitudinal or axial centerline axis 12 that extends there through for reference purposes. In general, the engine 10 may include a fan assembly 14 and a core engine 16 disposed downstream of the fan assembly 14.

The core engine 16 may generally include a substantially tubular outer casing 18 that defines an annular inlet 20. The core engine 16 further defines one or more flowpaths 70 therethrough. For example, the annular inlet 20 generally defines an opening to the flowpath 70 through which a flow of air 80 is directed to the compressor section 21, the combustion section 26, and the turbine section 31. However, it should be appreciated that engine 10 may further define one or more flowpaths for cooling or other fluid transfer or routing. The outer casing 18 encases or at least partially forms, in serial flow relationship, the compressor section 21 having a booster or low pressure (LP) compressor 22, a high pressure (HP) compressor 24, or one or more intermediate pressure (IP) compressors (not shown) disposed aerodynamically between the LP compressor 22 and the HP compressor 24; the combustion section 26; the turbine section 31 including a high pressure (HP) turbine 28, a low pressure (LP) turbine 30, and/or one or more intermediate pressure (IP) turbines (not shown) disposed aerodynamically between the HP turbine 28 and the LP turbine 30; and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. In other embodiments, an IP rotor shaft drivingly connects the IP turbine to the IP compressor (not shown). The LP rotor shaft 36 may also, or alternatively, be connected to a fan shaft 38 of the fan assembly 14. In particular embodiments, such as shown in FIG. 1, the LP shaft 36 may be connected to the fan shaft 38 via a power or reduction gear assembly 40 such as in an indirect-drive or geared-drive configuration. However, it should be appreciated that in other embodiments, the engine 10 may define a direct drive configuration without a reduction gear assembly.

Combinations of the compressors 22, 24, the turbines 28, 30, and the shafts 34, 36, 38 each define a rotor assembly 90 of the engine 10. For example, in various embodiments, the LP turbine 30, the LP shaft 36, the fan assembly 14 and/or the LP compressor 22 together define the rotor assembly 90 as a low pressure (LP) rotor assembly. The rotor assembly 90 may further include the fan rotor 38 coupled to the fan assembly 14 and the LP shaft 36 via the gear assembly 40. As another example, the HP turbine 28, the HP shaft 34, and the HP compressor 24 may together define the rotor assembly 90 as a high pressure (HP) rotor assembly. It should further be appreciated that the rotor assembly 90 may be defined via a combination of an IP compressor, an IP turbine, and an IP shaft disposed aerodynamically between the LP rotor assembly and the HP rotor assembly.

Figure 2:
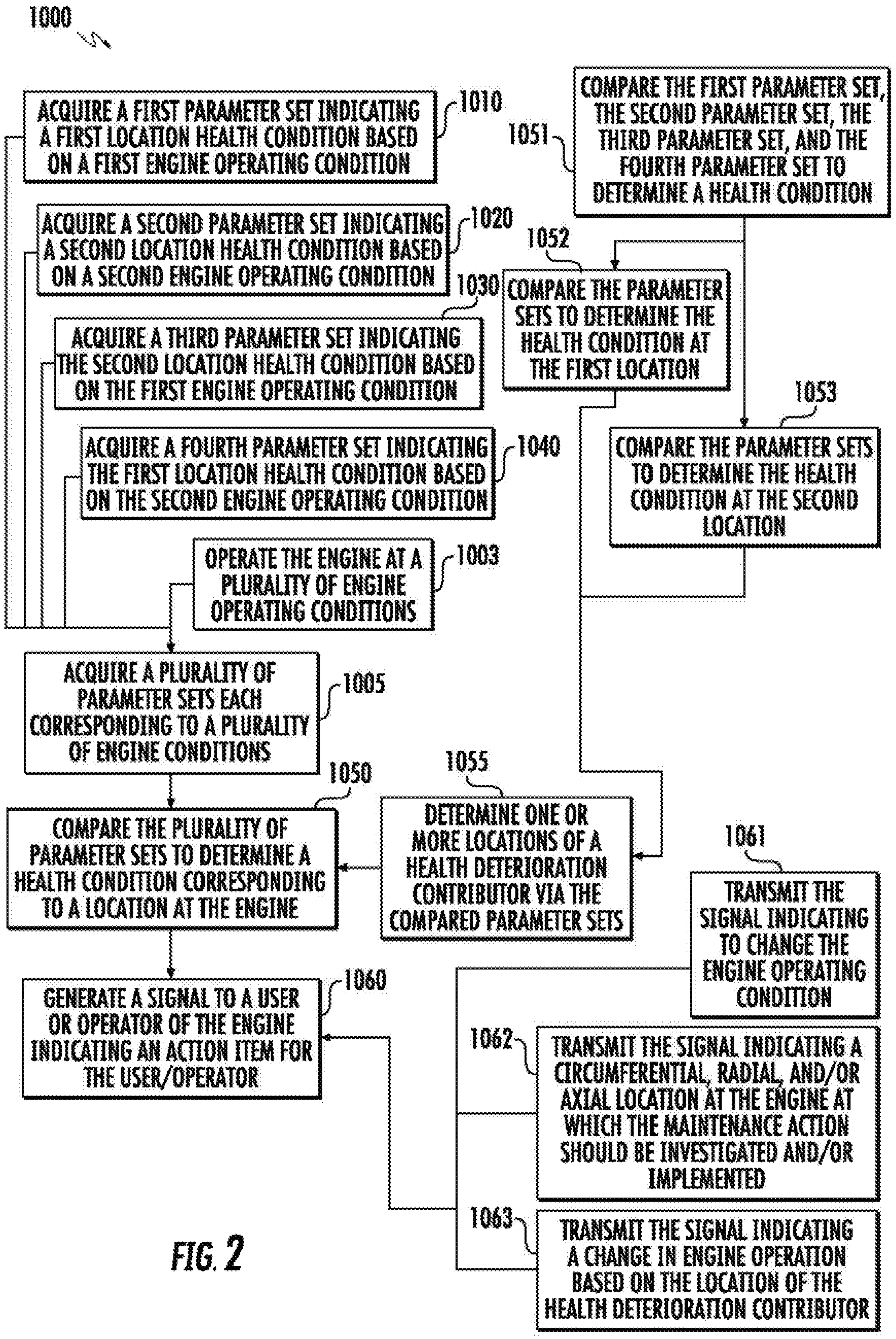
FIG. 2 is a flowchart outlining exemplary steps of a method for operating a turbo machine according to an aspect of the present disclosure.

In still various embodiments, the rotor assembly 90 further includes a bearing assembly 160 enabling rotation of the shaft (e.g., shaft 34, 36, 38) relative to a surrounding grounding or static structure (e.g., outer casing 18), such as further shown and described in regard to FIG. 2.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 4:
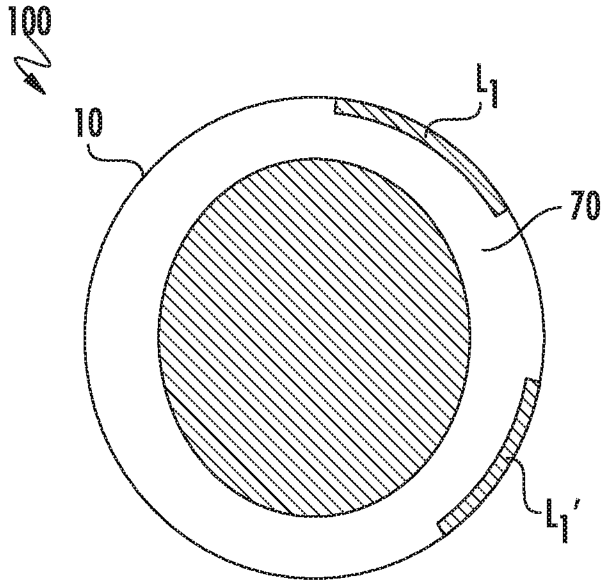
FIG. 4 is an exemplary cross sectional view of the flowpath of the turbo machine upstream of the cross sectional views depicted in regard to FIGS. 3A-3B.

The engine 10 further includes a plurality of sensors 240 (further referred to as sensors S herein) disposed throughout the engine 10. The sensors 240 may be mounted onto one or more surfaces at the engine 10, such as, but not limited to, the nacelle 44 or the outer casing 18, or generally at the fan section 14, the compressor section 21, the combustion section 26, the turbine section 31, or the exhaust section 32. As described in regard to sensors S, the sensors 240 may be configured to acquire parameter sets P such as described in regard to the method 1000 and FIGS. 2-4. In various embodiments, the sensors 240 may be configured to acquire or calculate vibrations measurement, stress or strain, thrust output, or applied load, pressure, temperature, or rotational speed. Although some exemplary locations are depicted in regard to FIG. 1, it should be appreciated that the sensors 240 may be disposed throughout the engine 10 such as generally outlined herein.

During operation of the engine 10, as shown in FIG. 1, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26, such as indicated schematically by arrows 82.

Referring still to FIG. 1, the combustion gases 86 generated in the combustion section 26 flows to the HP turbine 28 of the turbine section 31, thus causing the HP shaft 34 to rotate, thereby supporting operation of the HP compressor 24. As shown in FIG. 1, the combustion gases 86 are then routed to the LP turbine 30, thus causing the LP shaft 36 to rotate, thereby supporting operation of the LP compressor 22 and rotation of the fan shaft 38. The combustion gases 86 are then exhausted through the jet exhaust nozzle section 32 of the core engine 16 to provide propulsive thrust.

As operation of the engine 10 continues over a quantity of cycles, deterioration of various components generally results through normal wear, or foreign or domestic object debris and damage, or malfunction of the engine 10. Such deterioration or generally adverse operation of the engine 10 may induce rotating stall, surge, undesired combustion dynamics, undesired pattern factor or hot spots (e.g., temperature peaks across a circumferential and/or axial thermal gradient from the combustion chamber), lean blow out, rich blow out, deteriorating emissions performance (e.g., increased unburned hydrocarbons, carbon monoxide, carbon dioxide, oxides of nitrogen, particulates, etc.), coating or material loss, loss of thrust, loss of operability (e.g., an ability to operate over an intended operational envelope), or loss of performance, etc., or combinations thereof.

The engine 10 is configured to operate over a plurality of engine operating conditions, in which each engine operating condition corresponds to an operating mode of the engine. In various embodiments, the engine operating conditions correspond to a startup condition, a light-off condition, a minimum steady state operating condition, a maximum steady state operating condition, one or more intermediate steady state operating conditions between the minimum and maximum steady state operating conditions, or transient conditions between the minimum, maximum, and intermediate steady state operating conditions. Each engine operating condition defines a flow rate, pressure, and/or temperature of fluid within the engine 10 (e.g., engine inlet air 74, fan bypass air 78, core inlet air 80, compressed air 82, or combustion gases 86 through the flowpath 70, liquid or gaseous fuel, lubricant, hydraulic fluid, or other flow passages within the engine for heat exchange, pressurization, damping, etc.). Each engine operating condition may further define a circumferential, radial, and/or axial velocity, thermal, or pressure profile or gradient, swirl, turbulent or laminar flow profile of the fluid at the engine 10. The engine operating condition may generally correspond to the operating condition of the engine 10. The engine operating condition may further correspond to vane schedules (e.g., variable vane angles), bleed or bypass flow schedules (e.g., amount by which a valve is open or closed to divert a fluid), or deterioration at the engine.

As another example, the engine operating condition defines an actual engine operating condition, such as a minimum steady state operating condition (i.e., a minimum flow rate of fuel and/or oxidizer to sustain rotation of the rotor assembly 90 at approximately zero acceleration), a maximum steady state operating condition (i.e., a maximum flow rate of fuel and/or oxidizer to sustain rotation of the rotor assembly 90 at approximately zero acceleration), a transient condition between startup (i.e., acceleration from zero RPM) and the maximum steady state operating condition, or one or more intermediate steady state operating conditions. In various embodiments, such as in relation to aviation gas turbine engines, the engine operating condition may include one or more of a start condition, idle, takeoff, climb, cruise, and descent conditions, or transient conditions therebetween.

The engine operating condition may further correlate to a flow condition of the fluid within the flowpath of the engine. The flow condition generally alters, changes, or modulates based on or due to each operating condition of the engine. For example, an axial, radial, or circumferential flow condition of the fluid within the flowpath generally alters relative to each operating condition of the engine. As another example, a thermal gradient, a pressure gradient, or a velocity profile of the fluid within the flowpath alters relative to each operating condition of the engine. As still another example, the velocity profile may alter such as to increase or decrease an axial, radial, and/or circumferential flow rate of the fluid along the flowpath. Stated alternatively, the velocity profile may increase or decrease a magnitude of swirl of the fluid along the axial, radial, and/or circumferential directions within the flowpath.

Referring now to FIG. 2, embodiments of a method for generating a health condition prediction at a turbo machine engine are generally provided (hereinafter, "method 1000"). The embodiments of the method 1000 and a system for utilizing and executing the method (e.g., system 100 in FIG. 1) generally shown and described herein generate a health condition prediction at the engine based at least on comparing acquired parameter sets across a plurality of engine operating conditions from a plurality of sensors (e.g., sensors S in FIG. 1). Embodiments of the method 1000 generally provided herein may be utilized or executed in regard to the system 100 such as shown and described in regard to FIG. 1. However, it should be appreciated that the methods and systems shown and described herein may be utilized and executed in regard to turbine engines generally, including, but not limited to, gas turbine engines or steam turbine engines, including turboprop, turboshaft, turbofan, or turbojet configurations, including configurations for land-based or vehicle-based power generation, or land, sea, or aerial vehicles.

Embodiments of the methods and systems generally shown and described herein generate a health condition prediction providing an estimation of circumferential, radial, and/or axial location at the engine upstream of the sensors at which a health deterioration contributor or fault may be located. The health deterioration contributor generally includes a circumferential, radial, and/or axial location of damage at the engine, the location of malfunctioning components (e.g., flowpath leakage, flowpath damage such as to result in undesired flow conditions, fuel nozzle malfunction, stator or variable vane malfunction, seal or shroud damage or malfunction, or valve malfunction, leakage, or damage, or combinations thereof).

The method 1000 includes at 1005 acquiring, via a plurality of sensors S, a plurality of parameter sets P each corresponding to a plurality of engine conditions E, in which each parameter set P corresponding to each engine condition E indicates a health condition at a plurality of locations at the engine.

In various embodiments, the method 1000 further includes at 1010 acquiring, via a first sensor S1, a first parameter set P1E1S1 based on a first engine operating condition E1, in which the first parameter set P1E1S1 indicates a health condition of at a first location L1 of the engine, such as described above herein.

The method 1000 includes at 1020 acquiring, via the first sensor S1, a second parameter set P1'E2S1 based on a second engine operating condition E2, in which the second parameter set P1'E2S1 indicates a health condition at a second location L1' (i.e., different from the first location L1) at the second engine operating condition.

The method 1000 further includes at 1030 acquiring, via a second sensor S2, a third parameter set P1'E1S2 based on the first engine operating condition E1, in which the third parameter set P1'E1S2 indicates a health condition at the second location L1' at the first engine operating condition E1.

The method 1000 further includes at 1040 acquiring, via the second sensor S2, a fourth parameter set P1E2S2 based on the second engine operating condition E2, in which the fourth parameter set P1E2S2 indicates a health condition at the first location L1 at the second engine operating condition E2.

The method 1000 further includes at 1050 comparing the plurality of parameter sets to determine a health condition corresponding to a location at the engine. In various embodiments, the method 1000 at 1050 further includes at 1051 comparing or combining the first parameter set P1E1S1, the second parameter set P1'E2S1, the third parameter set P1'E1S2, and the fourth parameter set P1E2S2 to determine a health condition corresponding to a location at the engine. More specifically, the method 1000 may include at 1052 comparing or combining the parameter sets to determine the health condition at the first location L1. As such, the step 1052 may include comparing the first parameter set P1E1S1 and the fourth parameter set P1E2S2. Still further, the method 1000 may include at 1053 comparing or combining the parameter sets to determine the health condition at the second location L1'. As such, the step 1053 may include comparing or combining the second parameter set P1'E2S1 and the third parameter set P1'E1S2.

Still further, the method 1000 may further include at 1055 determining one or more locations of a health deterioration contributor via the compared parameter sets. For example, the method 1000 at 1055 may generally include comparing the parameter sets (e.g., at steps 1050, 1051, 1052, 1053) to determine the location of a fault at the engine, such as further described above and herein. The step at 1055 may include one or more operations or functions combining the parameter sets based on the plurality of engine operating conditions.

Additionally, it should be appreciated that the method 1000 at 1005, or more specifically at 1010, 1020, 1030, and 1040, may include acquiring from each available or operable sensor S (e.g., S1, S2, S3 . . . , S(N−1), SN) parameter sets P corresponding to each sensor S at each of the quantity X of engine operation condition E. For example, referring to FIGS. 3A-3B, at engine operating condition E1, sensor S1 may acquire parameter set P1E1S1 indicating a health condition corresponding to a first location L1; sensor S2 may acquire P1'E1S2 indicating a health condition corresponding to another location L1'; sensor S3 may acquire P1'E1S3 indicating a health condition corresponding to yet another location L"; through sensor SN acquiring $P1^{Y}E1SN$ indicating a health condition corresponding to still another location $L^{Y}$, in which Y is less than or equal to the quantity N of sensors S. Stated alternatively, quantity Y corresponds to the quantity of locations L at the engine at which the health condition acquired by parameter set P is indicative.

As still another example, at engine operating condition E2, sensor S1 may acquire parameter set P1'E2S1 indicating a health condition corresponding to a location different from the first location L1 (e.g., L1', or not L1); sensor S2 may acquire P1E2S2 indicating a health condition corresponding, at least in part, to the first location L1; sensor S3 may acquire another parameter set indicating a health condition corresponding to yet another location different from L1 and L1'; through sensor SN acquiring $P1^{Yi}E2SN$ indicating a health condition corresponding to still another location $L^{Yi}$ different, at least in part, from $L^{Y}$.

As such, the plurality of sensors S each acquire at each engine operating condition E through quantity X a plurality of parameter sets P each corresponding to different combinations of locations at the engine such as due to changes in measurement range R with each engine operating condition E. Furthermore, the method 1000 at 1050, or more specifically at 1051, 1052, and 1053, may include comparing and combining the plurality of parameter sets each indicating different combinations of locations to determine a health condition at the plurality of locations at the engine. The method 1000 at 1055 may further determine the health condition at the engine based on the plurality of parameter sets each indicating different combinations of locations.

In various embodiments, the method 1000 further includes at 1060 generating and providing a signal to a user or operator of the engine indicating an action item for the user/operator. For example, the action item may include an engine manoeuver, a maintenance action, or an operating limit.

The signal generated at 1060 indicating the engine manoeuver may further include at 1061 transmitting the signal indicating to change the engine operating condition. For example, changing the engine operating condition may include changing acceleration or rotational speed of the engine, changing pressure, temperature, and/or flow rate of fluid within the engine, or changing thrust output. For example, the engine manoeuver may include adjusting a variable vane angle such as to adjust a pressure and/or flow rate of fluid within the engine; adjusting a fuel flow rate or pressure such as to adjust rotational speed and/or pressure, flow rate and/or temperature of fluid within the engine; or modulating a valve (e.g., bleed or bypass valve) such as to adjust a flow rate and/or pressure of fluid within a flowpath, or combinations thereof. The signal indicating the engine manoeuver, or changes thereof, may enable continued or prolonged operation of the engine while mitigating further deterioration of the engine, or decreasing a rate of deterioration of the engine.

The signal generated at 1060 indicating the maintenance action may include at 1062 transmitting the signal indicating a circumferential, radial, and/or axial location at the engine at which the maintenance action should be investigated and/or implemented. For example, the location at the engine may indicate a module or stage at a compressor section or turbine section of the engine at which the health deterioration contributor is located; a location along the flowpath at which the health deterioration contributor is located; or a location of along fixed components at which the health deterioration contributor is located. For example, the signal indicating the maintenance action may indicate the location of a leak or a faulty component (e.g., fuel nozzle, vane, valve, manifold, etc.), at which the user/operator should further investigate the location or repair/replace the component at the indicated location.

The signal generated at 1060 indicating the operating limit may include at 1063 transmitting the signal indicating a change in engine operation based on the location of the health deterioration contributor. For example, an indicated location of a fault, damage, or defect may further indicate the user/operator of the engine to continue operation at a reduced thrust output, pressure, flow rate, and/or temperature based on the location of the health deterioration contributor. As such, the user/operator may adjust operation of the engine until the health deterioration contributor is remedied via the maintenance action.

In various embodiments, the parameter sets P are one or more of a temperature, a pressure, a flow rate, or other calculated or measured parameter of a fluid at the engine. For example, the fluid may include air or combustion gases within a core flowpath, a bypass flowpath, a heat exchange flowpath, a lubricant flowpath, or another flowpath within the engine. As another example, the fluid may include fuel, lubricant, hydraulic fluid, coolant, or another liquid or gaseous fluid within the engine.

In still various embodiments, the plurality of sensors S each defines a discrete sensor location at the engine. For example, the plurality of sensors S defines quantity of sensors S1 through SN, in which N>1. Each sensor S defines a discrete axial, radial, and/or circumferential location of the engine different from each other sensor of the plurality of sensors S.

In one embodiment, the plurality of sensors S may be defined along an axial plane of the engine, such as along axial direction A in regard to the engine 10 depicted in FIG. 1. For example, each sensor S is separated circumferentially along the flowpath, such as generally depicted in regard to FIGS. 3A-3B. The sensors S depicted in regard to FIGS. 3A-3B generally acquire parameter sets P indicating a location L1 and L1' upstream of the sensors S (e.g., depicted in regard to FIG. 4). In other embodiments (not shown), each sensor S is separated radially along the flowpath, or separated in combination radially and circumferentially along the flowpath. As yet another example, each sensor S is separated axially along the flowpath, or separated in combination radially, circumferentially, and axially along the flowpath.

It should be appreciated that the system and method described herein may further include at 1003 operating the engine at a plurality of engine operating conditions E such that the sensors S may acquire the parameter sets P described in regard to step 1005, or more specifically in regard to steps 1010, 1020, 1030, 1040. Still further, the method 1000 at 1003 may include operating the engine based at least on the transmitted and generated signal (e.g., step 1060, 1061, 1062, 1063). For example, the method 1000 at 1003 may include changing the engine operating condition via changing a rotational speed, air or fuel flow rate, pressure, or temperature, an acceleration/deceleration or other rate of change of fluid flow or rotor speed, or a vane or bleed schedule, or combinations thereof. As another example, the method 1000 at 1003 may include changing the engine operating condition such as to enable performance of the maintenance action, such as, but not limited to, commanded shutdown of the engine, or components thereof.

Referring back to FIG. 1, the system 100 may further include a computing device 210. In general, the computing device 210 can correspond to any suitable processor-based device, including one or more computing devices. For instance, FIG. 1 illustrates one embodiment of suitable components that can be included within the computing device 210. As shown in FIG. 1, the computing device 210 can include a processor 212 and associated memory 214 configured to perform a variety of computer-implemented functions. In various embodiments, the computing device 210 may be configured to operate the engine 10, such as to control the engine 10 to operate at an engine operating condition defining operating conditions of the engine such as further described herein. In still various embodiments, the computing device 210 may be further configured to execute one or more steps or operations of the method 1000 generally described herein.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the computing device 210 may define one or more of a full authority digital engine controller (FADEC), a propeller control unit (PCU), an engine control unit (ECU), or an electronic engine control (EEC).

As shown, the computing device 210 may include control logic 216 stored in memory 214. The control logic 216 may include instructions that when executed by the one or more processors 212 cause the one or more processors 212 to perform operations such as described in regard to method 1000.

Additionally, as shown in FIG. 1, the computing device 210 may also include a communications interface module 230. In various embodiments, the communications interface module 230 can include associated electronic circuitry that is used to send and receive data. As such, the communications interface module 230 of the computing device 210 can be used to receive data from the engine 10 (e.g., at one or more of the rotor assembly 90, the gear assembly 40, flowpaths at the core engine 16 and/or fan bypass airflow passage 48, the bearing 160, or sensor 240 proximate or attached thereto) providing parameter set P, such as, but not limited to, a vibrations measurement (e.g., an accelerometer, a proximity probe, a displacement probe, etc.), stress or strain (e.g., a strain gage), thrust output (e.g., calculated via engine pressure ratio), or applied load (e.g., a load cell), pressure (e.g., a pressure transducer or pressure probe), temperature (e.g., thermocouple), or rotational speed (e.g., a 1/rev signal, a tachometer, or other speed detection device proximate to the rotor assembly 90). In addition, the communications interface module 230 can also be used to communicate with any other suitable components of the engine 10, including any number of sensors S configured to monitor and/or acquire one or more parameter sets P of the engine 10.

It should be appreciated that the communications interface module 230 can be any combination of suitable wired and/or wireless communications interfaces and, thus, can be communicatively coupled to one or more components of the system 100 including the engine 10 via a wired and/or wireless connection. As such, the computing device 210 may operate, modulate, or adjust operation of the engine 10, acquire parameters via the sensor S, or determine a location of the health deterioration contributor, or other steps such as described in regard to the method 1000.

It should further be appreciated that the system 100 may include a plurality of the computing device 210 configured to collectively, or individually, perform one or more of the operations or steps of the method 1000 generally described herein. For example, one or more computing devices 210 may be configured to operate the engine 10. Another computing device 210 may be configured to determine the location of the health deterioration contributor. The one or more computing devices 210 may be coupled together via any combination of suitable wired and/or wireless communications interfaces, such as to acquire, transmit, determine, generate, or provide data, calculations, results, instructions, or commands across the one or more computing devices 210. Such combinations of suitable wired and/or wireless communications interfaces may include, but is not limited to, centralized networks or databases, including those referred to as cloud networks.

As such, it should be appreciated that the system 100 may include one or more computing devices 210 in communication from the engine 10 to another computing device 210 located at an aircraft to which the engine 10 is coupled (e.g., cockpit or other aircraft control), or off of the aircraft. For example, the computing device 210 may be located at a ground-, sea-, or space-based facility or apparatus, or another aircraft.

Embodiments of the methods and systems shown and described herein enable determining a more precise location at the engine of a health deterioration contributor, such as damage or wear, foreign or domestic object debris, or malfunction, or other operational nonconformance or anomaly. The determined location may be transmitted to a user/operator of the engine such as to adjust operation of the engine due to the deterioration contributor, or to provide targeted maintenance, repair, or replacement of the deteriorated component based on the location of the deterioration contributor provided via the method and system. The determined location may further reduce time lost in troubleshooting, investigating, or otherwise repairing an engine. The determined location may further mitigate damage to the engine during operation via providing real-time troubleshooting during engine operation such as to enable the user/operator to adjust engine operation accordingly.

Particular embodiments of the methods and systems generally provided herein may acquire sensor to sensor variation (e.g., from a first sensor S1 at a first position at the engine and a second sensor S2 at a second position different from the first position) across variations in engine operating condition (e.g., from a first engine operating condition $E_1$ and a second engine operating condition $E_2$). For example, the sensor (e.g., sensor S) may define a temperature probe (e.g., exhaust gas temperature or EGT probe) disposed in the turbine section 31 or exhaust section 32. The method 1000 may improve determining a health deterioration contributor, and a location L thereof, (e.g., fuel nozzle coking, cracking, leakage, etc.) that may result in hot or cold streaks circumferentially, radially, and/or axially within the flowpath 70 via acquiring parameters and comparing sensor to sensor variation at the plurality of engine operating conditions.

In other embodiments, the sensor may define a pressure probe disposed at the compressor section 21, the combustion section 26, the turbine section 31, the exhaust section 32, or the fan section 14. The method 1000 may improve operation, maintenance, or performance of the engine 10 by improving determination of a health deterioration contributor via acquiring parameters and comparing sensor to sensor variation at the plurality of engine operating conditions. Additionally, or alternatively, the method 1000 may improve operation, maintenance, or performance of the engine 10 by improving a thrust output (e.g., calculated thrust output via engine pressure ratio or EPR) via improving determination of a health deterioration contributor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for determining performance of an engine, the system comprising:
- a plurality of sensors respectively positioned at a plurality of positions at a flowpath, wherein a plurality of locations at the engine are upstream from the plurality of positions of the plurality of sensors, and
- one or more computing devices configured to perform operations, the operations comprising:
  - acquiring, via the plurality of sensors, a plurality of parameter sets, wherein each of the plurality of parameter sets corresponds to:
    - one of the plurality of sensors;
    - one of a plurality of engine conditions, wherein the plurality of engine conditions are different from one another; and
    - a subset of the plurality of locations at the engine, wherein a health condition is indicated for each location in the subset of the plurality of locations, wherein the subset of the plurality of locations at the engine is based on the one of the plurality of sensors and the one of the plurality of engine conditions;
  - combining, via the computing device, at least one of the plurality of parameter sets corresponding to a first one of the plurality of engine conditions and at least one of the plurality of parameter sets corresponding to a second one of the plurality of engine conditions; and
  - generating, via the computing device, a health condition prediction based on the health conditions of the combined parameter sets.

2. The system of claim 1,
wherein at least one of the health conditions of the health condition prediction is a health deterioration contributor.

3. The system of claim 2, wherein each of the plurality of locations is indicative of a fuel nozzle, a variable vane, or a valve.

4. The system of claim 1, wherein number of locations in the subset of the plurality of locations at the engine is based on a measurement range of the one of the plurality of sensors during the one of the plurality of engine conditions.

5. The system of claim 4, wherein the measurement range of the one of the plurality of sensors at a first one of the plurality of engine conditions is different than the measurement range of the one of the plurality of sensors at a second one of the plurality of engine conditions.

6. The system of claim 1, wherein the health conditions of the combined parameter sets correspond to a circumferential temperature profile at the plurality of locations of the engine.

7. The system of claim 6, wherein the plurality of locations correspond to a plurality of fuel nozzles.

8. The system of claim 1, wherein the health conditions of the combined parameter sets correspond to a circumferential pressure profile at the plurality of locations of the engine.

9. The system of claim 8, wherein each of the plurality of locations correspond to a variable vane, a valve, or a shroud.

10. The system of claim 1, wherein the plurality of engine conditions include two or more of startup, ground idle, cruise, climb, takeoff, or approach.

11. The system of claim 1, wherein the plurality of locations at the engine are distributed over a circumference of the flowpath.

12. The system of claim 1, wherein the sensors are respectively positioned at the plurality of positions around a circumference of the flowpath.

13. The system of claim 1, wherein the subset of the plurality of locations at the engine is based on the one of the plurality of sensors and the one of the plurality of engine conditions such that a first subset of the plurality of locations corresponding to a first one of the plurality of sensors and a first one of the plurality of engine conditions is different from a second subset of the plurality of locations corresponding to the first one of the plurality of sensors and a second one of the plurality of engine conditions.

14. The system of claim 1, wherein circumferential swirl of a first of the plurality of engine conditions is different from a circumferential swirl of a second of the plurality of engine conditions.

15. The system of claim 1, wherein the number of the plurality of sensors is less than the number of the plurality of locations.

16. The system of claim 1, wherein the plurality of sensors include exhaust gas temperature sensors.

17. The system of claim 1, wherein the plurality of sensors include pressure sensors.

* * * * *